(12) United States Patent
Yura et al.

(10) Patent No.: US 12,119,501 B2
(45) Date of Patent: Oct. 15, 2024

(54) COIN-TYPE LITHIUM SECONDARY CELL

(71) Applicant: NGK INSULATORS, LTD., Nagoya (JP)

(72) Inventors: Yukinobu Yura, Nagoya (JP); Kazuki Maeda, Nagoya (JP); Masanori Tajima, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 732 days.

(21) Appl. No.: 17/203,950

(22) Filed: Mar. 17, 2021

(65) Prior Publication Data
US 2021/0203025 A1 Jul. 1, 2021

Related U.S. Application Data

(63) Continuation of application No. PCT/JP2019/042327, filed on Oct. 29, 2019.

(30) Foreign Application Priority Data

Oct. 30, 2018 (JP) .................. 2018-204397

(51) Int. Cl.
*H01M 50/109* (2021.01)
*H01M 4/02* (2006.01)
(Continued)

(52) U.S. Cl.
CPC ....... *H01M 50/109* (2021.01); *H01M 4/0471* (2013.01); *H01M 4/131* (2013.01);
(Continued)

(58) Field of Classification Search
CPC .................................................. H01M 50/109
See application file for complete search history.

(56) References Cited

U.S. PATENT DOCUMENTS

2002/0068221 A1  6/2002  Watanabe et al.
2005/0010026 A1* 1/2005  Yoshimura .......... H01M 50/193
                                                                528/125
(Continued)

FOREIGN PATENT DOCUMENTS

JP  2000-164217 A1  6/2000
JP  2004-083388 A1  3/2004
(Continued)

OTHER PUBLICATIONS

Dimensional analysis and modelling of energy density of lithium-ion battery, Journal of Energy Storage, 18, pp. 308-315, dated May 29, 2018 (Year: 2018).*

(Continued)

*Primary Examiner* — Brian R Ohara
*Assistant Examiner* — Michelle T Leonard
(74) *Attorney, Agent, or Firm* — BURR PATENT LAW, PLLC (57) ABSTRACT

A coin-type lithium secondary cell for soldering by reflow method includes a positive electrode including a lithium composite oxide, a negative electrode, an electrolyte layer provided between the positive electrode and the negative electrode and including an electrolytic solution, a cell case having an enclosed space in which the positive electrode, the negative electrode, and the electrolyte layer are housed. The positive electrode and the negative electrode as a whole contains 3.0% by mass or less of lithium carbonate.

6 Claims, 5 Drawing Sheets

(51) Int. Cl.
    *H01M 4/04*    (2006.01)
    *H01M 4/131*    (2010.01)
    *H01M 10/0525*    (2010.01)
    *H01M 50/409*    (2021.01)
    *H01M 50/434*    (2021.01)

(52) U.S. Cl.
    CPC ..... *H01M 10/0525* (2013.01); *H01M 50/409* (2021.01); *H01M 50/434* (2021.01); *H01M 2004/027* (2013.01); *H01M 2004/028* (2013.01)

(56) References Cited

U.S. PATENT DOCUMENTS

| | | | |
|---|---|---|---|
| 2005/0123832 A1 | 6/2005 | Tsukuma et al. | |
| 2009/0246636 A1* | 10/2009 | Chiang | H01M 50/46 429/231.95 |
| 2012/0009471 A1 | 1/2012 | Sugiura et al. | |
| 2017/0187031 A1* | 6/2017 | Kurita | H01M 10/0525 |
| 2018/0233744 A1 | 8/2018 | Ohira et al. | |
| 2018/0287201 A1* | 10/2018 | Okuda | H01M 4/485 |
| 2021/0043919 A1 | 2/2021 | Yura et al. | |

FOREIGN PATENT DOCUMENTS

| | | |
|---|---|---|
| JP | 2004-327305 A | 11/2004 |
| JP | 2004-335185 A1 | 11/2004 |
| JP | 2005-310578 A1 | 11/2005 |
| JP | 2005-317266 A1 | 11/2005 |
| JP | 4392189 B2 | 12/2009 |
| JP | 5587052 B2 | 9/2014 |
| JP | 2015-185337 A1 | 10/2015 |
| JP | 2015-220101 A1 | 12/2015 |
| WO | 2017/146088 A1 | 8/2017 |
| WO | 2019/221139 A1 | 11/2019 |

OTHER PUBLICATIONS

Machine translation of JP2005317266A (Year: 2005).*
Machine translation of JP2000164217A (Year: 2000).*
International Search Report and Written Opinion (Application No. PCT/JP2019/042327 dated Feb. 4, 2020.
English translation of the International Preliminary Report on Patentability (Chapter I) (Application No. PCT/JP2019/042327) dated May 14, 2021.
Extended European Search Report dated Jul. 6, 2022 (Application No. 19878558.6).

* cited by examiner

COIN-TYPE LITHIUM SECONDARY CELL

CROSS-REFERENCE TO RELATED APPLICATION

The present application is a continuation application of International Application No. PCT/JP2019/042327 filed on Oct. 29, 2019, which claims priority to Japanese Patent Application No. 2018-204397 filed on Oct. 30, 2018. The contents of these applications are incorporated herein by reference in their entirety.

TECHNICAL FIELD

The present invention relates to a coin-type lithium secondary cell for soldering by reflow method.

BACKGROUND ART

Various coin-type secondary cells have conventionally been used. For example, Japanese Patent Publication No. 4392189 (Document 1) discloses a coin-type secondary cell for soldering by reflow method, in which a lithium-containing manganese oxide is used as a positive active material. In this coin-type secondary cell, the concentration of lithium salt contained in an electrolytic solution is set in the range of 1.5 to 2.5 mol/l in order to suppress reactions of the electrolytic solution and the lithium-containing manganese oxide caused by reflow soldering and to achieve favorable reflow heat resistance.

Japanese Patent Publication No. 5587052 (Document 2) discloses a positive electrode of a lithium secondary cell, in which a lithium composite oxide sintered plate with a thickness greater than or equal to 30 μm, a porosity of 3 to 30%, and an open porosity greater than or equal to 70% is used as a positive active material layer of the positive electrode. International Publication No. WO/2017/146088 (Document 3) discloses a lithium secondary cell including a solid electrolyte, in which an oriented sintered plate is used as a positive electrode. The oriented sintered plate contains a plurality of primary particles of a lithium composite oxide such as lithium cobaltate ($LiCoO_2$), and the primary particles are oriented to the plate surface of the positive electrode at an average orientation angle greater than 0° and less than or equal to 30°. Japanese Patent Application Laid-Open No. 2015-185337 (Document 4) discloses an all solid-state cell that uses a lithium titanate ($Li_4Ti_5O_{12}$) sintered body as an electrode.

As described previously, according to Document 1, reactions of the electrolytic solution and the positive active material caused by heat during reflow soldering can be suppressed by adjusting the concentration of lithium salt contained in the electrolytic solution within a predetermined range. However, in the coin-type lithium secondary cell for soldering by reflow method, deterioration of performance due to reflow soldering may be caused by other factors.

SUMMARY OF INVENTION

The present invention is intended for a coin-type lithium secondary cell for soldering by reflow method, and it is an object of the present invention to achieve a coin-type lithium secondary cell with reduced deterioration of performance caused by reflow soldering.

The coin-type lithium secondary cell according to the present invention includes a positive electrode containing a lithium composite oxide, a negative electrode, an electrolyte layer provided between the positive electrode and the negative electrode and containing an electrolytic solution, and a cell case having an enclosed space in which the positive electrode, the negative electrode, and the electrolyte layer are housed. The positive electrode and the negative electrode as a whole contain 3.0% or less by mass of lithium carbonate.

According to the present invention, it is possible to achieve a coin-type lithium secondary cell with reduced deterioration of performance caused by reflow soldering.

In one preferable embodiment of the present invention, the positive electrode and the negative electrode as a whole contain 0.002% or more by mass of lithium carbonate.

In another preferable embodiment of the present invention, the negative electrode contains a lithium composite oxide.

In another preferable embodiment of the present invention, the positive electrode and the negative electrode are sintered bodies.

In another preferable embodiment of the present invention, the electrolyte layer includes a ceramic separator, and the positive electrode, the ceramic separator, and the negative electrode are formed into an integral sintered body.

In another preferable embodiment of the present invention, the coin-type lithium secondary cell has a thickness of 0.7 to 1.6 mm and a diameter of 10 to 20 mm.

In another preferable embodiment of the present invention, the coin-type lithium secondary cell has an energy density of 35 to 200 $mWh/cm^3$ before reflow soldering.

In another preferable embodiment of the present invention, the coin-type lithium secondary cell after reflow soldering has a capacity higher than or equal to 65% of the capacity of the coin-type lithium secondary cell before the reflow soldering.

These and other objects, features, aspects and advantages of the present invention will become more apparent from the following detailed description of the present invention when taken in conjunction with the accompanying drawings.

DESCRIPTION OF EMBODIMENTS

Coin-Type Lithium Secondary Cell

Figure 1:
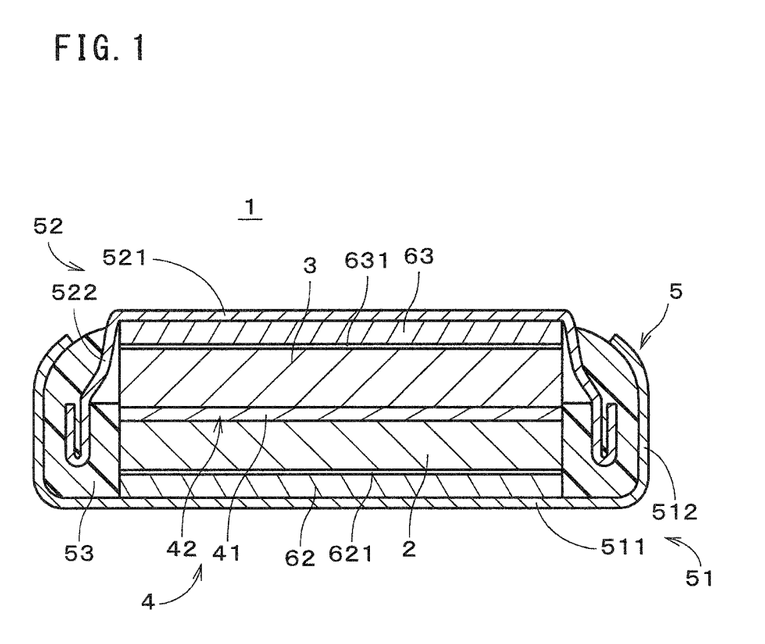
FIG. 1 is a diagram illustrating a configuration of a coin-type lithium secondary cell.

FIG. 1 is a diagram illustrating a configuration of a coin-type lithium secondary cell 1 according to one embodiment of the present invention. The coin-type lithium secondary cell 1 (hereinafter, also simply referred to as a "coin-type secondary cell 1") includes a positive electrode 2, a negative electrode 3, an electrolyte layer 4, and a cell case 5. As will be described later, the positive electrode 2 contains a lithium composite oxide. The electrolyte layer 4 is provided between the positive electrode 2 and the negative electrode 3 and contains an electrolytic solution 42. The cell case 5 has an enclosed space therein. The positive electrode 2, the negative electrode 3, and the electrolyte layer 4 are housed in the enclosed space. The coin-type secondary cell 1 is designed for soldering by reflow method, and electrically connected to and mounted on a wiring board by reflow soldering.

The positive electrode 2 containing a lithium composite oxide may contain lithium carbonate generated by, for example, reactions with lithium in the process of fabrication. As will be described later, the same applies to the case where the negative electrode 3 contains a lithium composite oxide. In the coin-type secondary cell 1, the percentage of lithium carbonate contained in the positive electrode 2 and the negative electrode 3 as a whole (hereinafter, simply referred to as the "percentage of lithium carbonate in the electrodes) is less than or equal to 3.0% by mass. The percentage of lithium carbonate in the electrodes is obtained by dividing the mass of lithium carbonate contained in the positive electrode 2 and the negative electrode 3 as a whole by a total mass of the positive electrode 2 and the negative electrode 3. The percentage of lithium carbonate in the electrodes is the value for the coin-type secondary cell 1 before the reflow soldering described previously.

During the reflow soldering, the coin-type secondary cell 1 is heated to a high temperature (e.g., a temperature of 200 to 260° C.) for a predetermined amount of time. At this time, a coin-type secondary cell according to a comparative example in which the percentage of lithium carbonate in the electrodes is 5.0% by mass exhibits deteriorated performance. Although the reason why the performance deteriorates due to the reflow soldering remains uncertain, one conceivable cause is that reactions of, for example, lithium carbonate in the electrodes and the electrolytic solution during the reflow soldering may have some influences on the electrodes. Another possible cause is that the reactions of, for example, lithium carbonate and the electrolytic solution may yield a gas.

In contrast, in the coin-type secondary cell 1 illustrated in FIG. 1, the percentage of lithium carbonate in the electrodes is less than or equal to 3.0% by mass, which is lower than the percentage of lithium carbonate in the electrodes of the coin-type secondary cell 1 according to the comparative example described above. This suppresses reactions of, for example, lithium carbonate and the electrolytic solution 42 during the reflow soldering and accordingly achieves reduced deterioration of performance caused by the reflow soldering. For example, the capacity of the coin-type secondary cell 1 after the reflow soldering is higher than or equal to 65% (typically, less than or equal to 100%) of the capacity of the cell before the reflow soldering. Preferably, the capacity of the cell after the reflow soldering is higher than or equal to 75% of the capacity of the cell before the reflow soldering. In order to more reliably suppress deterioration of the performance of the coin-type secondary cell 1 caused by reflow soldering, the percentage of lithium carbonate in the electrodes is preferably less than or equal to 2.5% by mass, more preferably less than or equal to 2.0% by mass, and yet more preferably less than or equal to 1.5% by mass.

In order to reduce the percentage of lithium carbonate in the electrodes, it is effective to lower the percentages of lithium in raw materials in the production of the positive electrode 2, which contains a lithium composite oxide. Alternatively, the percentage of lithium carbonate in the electrodes can also be reduced by rinsing the positive electrode 2 with water, i.e., by causing lithium carbonate contained in the positive electrode 2 to dissolve in water and be removed before the assembly of the coin-type secondary cell 1. In this case, using hot water to rinse the positive electrode 2 further reduces the percentage of lithium carbonate in the electrodes. The temperature of the hot water is, for example, higher than or equal to 40° C., preferably higher than or equal to 50° C., and more preferably higher than or equal to 60° C. When the negative electrode 3 contains a lithium composite oxide, the percentage of lithium carbonate in the electrodes further tends to be higher, and as in the case of the positive electrode 2, it is possible to reduce the percentage of lithium carbonate in the electrodes by reducing the percentages of lithium in raw materials of the negative electrode 3 and/or by rinsing the negative electrode 3 with water.

The percentage of lithium carbonate in the electrodes can be measured using, for example, the following technique. First, particles obtained by pulverizing the positive electrode 2 and the negative electrode 3 are suspended in water and left at rest for a predetermined period of time, and thereafter a supernatant liquid is extracted. The supernatant liquid contains lithium carbonate eluted from the positive electrode 2 and the negative electrode 3. Then, the supernatant liquid is subjected to inductively coupled plasma (ICP) analysis to measure the mass of lithium carbonate contained in the supernatant liquid. The mass of lithium carbonate is then divided by a total mass of the positive electrode 2 and the negative electrode 3, which has been measured in advance, to obtain the percentage of lithium carbonate in the electrodes.

When the percentage of lithium carbonate in the electrodes of the coin-type secondary cell 1 is excessively low, the deterioration of performance caused by reflow soldering may not be suppressed enough. The reason for this remains uncertain, but one conceivable cause is that the presence of almost no lithium carbonate on electrode surfaces facilitates reactions of, for example, active materials themselves of the electrodes and the electrolytic solution and thereby degrades the electrodes. In order to reduce the deterioration of performance caused by reflow soldering, arising from an excessively low percentage of lithium carbonate in the electrodes, the percentage of lithium carbonate in the electrodes is preferably higher than or equal to 0.002% by mass, and more preferably higher than or equal to 0.003% by mass. In the coin-type secondary cell 1, the percentage of lithium carbonate in the electrodes may be set to be higher than or equal to 0.10% by mass.

The thickness of the coin-type secondary cell 1 (the distance between the outside surface of a flat plate portion 511 of a positive electrode can 51 and the outside surface of a flat plate portion 521 of a negative electrode can 52, which will be described later) is, for example, in the range of 0.7 to 1.6 mm. In order to reduce the thickness of a later-described circuit board assembly with the coin-type secondary cell 1 mounted thereon, an upper limit value of the thickness of the coin-type secondary cell 1 is preferably 1.4 mm, and more preferably 1.2 mm. From the viewpoint of ensuring a certain degree of thickness for the positive electrode 2 and the negative electrode 3 and increasing the capacity of the cell, a lower limit value of the thickness of the coin-type secondary cell 1 is preferably 0.8 mm, and more preferably 0.9 mm.

The diameter of the coin-type secondary cell 1 (the diameter of the flat plate portion 511 of the positive electrode can 51, described later) is, for example, in the range of 10 to 20 mm. In order to achieve downsizing of the circuit board assembly with the coin-type secondary cell 1 mounted thereon, an upper limit value of the diameter of the coin-type secondary cell 1 is preferably 18 mm, and more preferably 16 mm. From the viewpoint of ensuring a certain degree of size for the positive electrode 2 and the negative electrode 3 and increasing the capacity of the cell, a lower limit value of the diameter of the coin-type secondary cell 1 is preferably 10.5 mm, and more preferably 11 mm.

As will be described later, a preferable coin-type secondary cell 1 uses a lithium composite oxide sintered plate as the positive electrode 2 and a titanium-containing sintered plate as the negative electrode 3. This realizes the coin-type lithium secondary cell that has excellent heat resistance to enable soldering by reflow method, that provides high capacity and high output while being low-profile and compact, and that is capable of constant-voltage (CV) charging. The coin-type secondary cell 1 preferably has an energy density higher than or equal to 35 mWh/cm$^3$ before reflow soldering. A lower limit value of the energy density is more preferably 40 mWh/cm$^3$, and yet more preferably 50 mWh/cm$^3$. There are no particular limitations on an upper limit value of the energy density of the coin-type secondary cell 1, but the upper limit value is, for example, 200 mWh/cm$^3$.

The positive electrode 2 is, for example, a plate-like sintered body. The fact that a sintered body is used as the positive electrode 2 means that the positive electrode 2 contains neither binders nor conductive assistants. This is because even if a green sheet contains a binder, the binder will be destroyed or burnt down during firing. Using a sintered body as the positive electrode 2 allows the positive electrode 2 to ensure heat resistance during reflow soldering. Besides, deterioration of the positive electrode 2 caused by the electrolytic solution 42 can also be moderated as a result of the positive electrode 2 containing no binders. The positive electrode 2 is preferably porous, i.e., preferably has pores.

As described previously, the positive electrode 2 contains a lithium composite oxide, and a preferable positive electrode 2 is a lithium composite oxide sintered plate. The lithium composite oxide is in particular preferably lithium cobaltate (typically, LiCoO$_2$; hereinafter abbreviated as "LCO"). Various lithium composite oxide sintered plates or LCO sintered plates are known, and for example, those that are disclosed in Document 2 described above (Japanese Patent Publication No. 5587052) and Document 3 described above (International Publication No. WO/2017/146088) may be used. Although in the following description, a lithium composite oxide sintered plate is used as the positive electrode 2, the positive electrode 2 may be an electrode other than a sintered body depending on the design of the coin-type secondary cell 1. One example of such a different positive electrode 2 is a powder dispersed-type positive electrode (so-called coating electrode) produced by applying and drying a positive electrode mixture that contains, for example, a positive active material containing a lithium composite oxide, a conductive assistant, and a binder.

The lithium composite oxide sintered plate described above is preferably an oriented positive electrode plate that contains a plurality of primary particles of a lithium composite oxide and in which the primary particles are oriented to the plate surface of the positive electrode at an average orientation angle greater than 0° and less than or equal to 30°.

Figure 2:
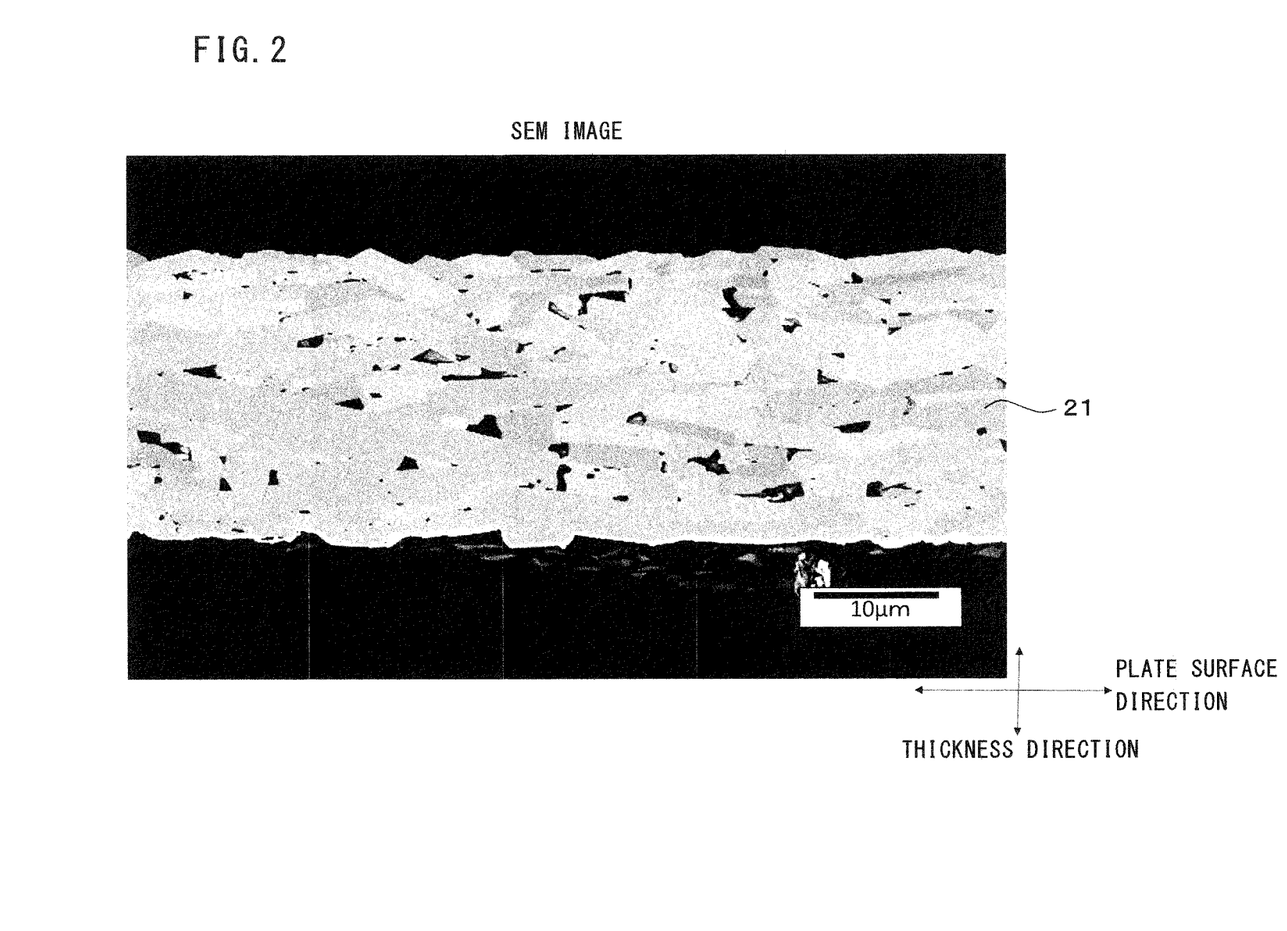
FIG. 2 is a diagram illustrating a sectional SEM image of an oriented positive electrode plate.
Figure 3:
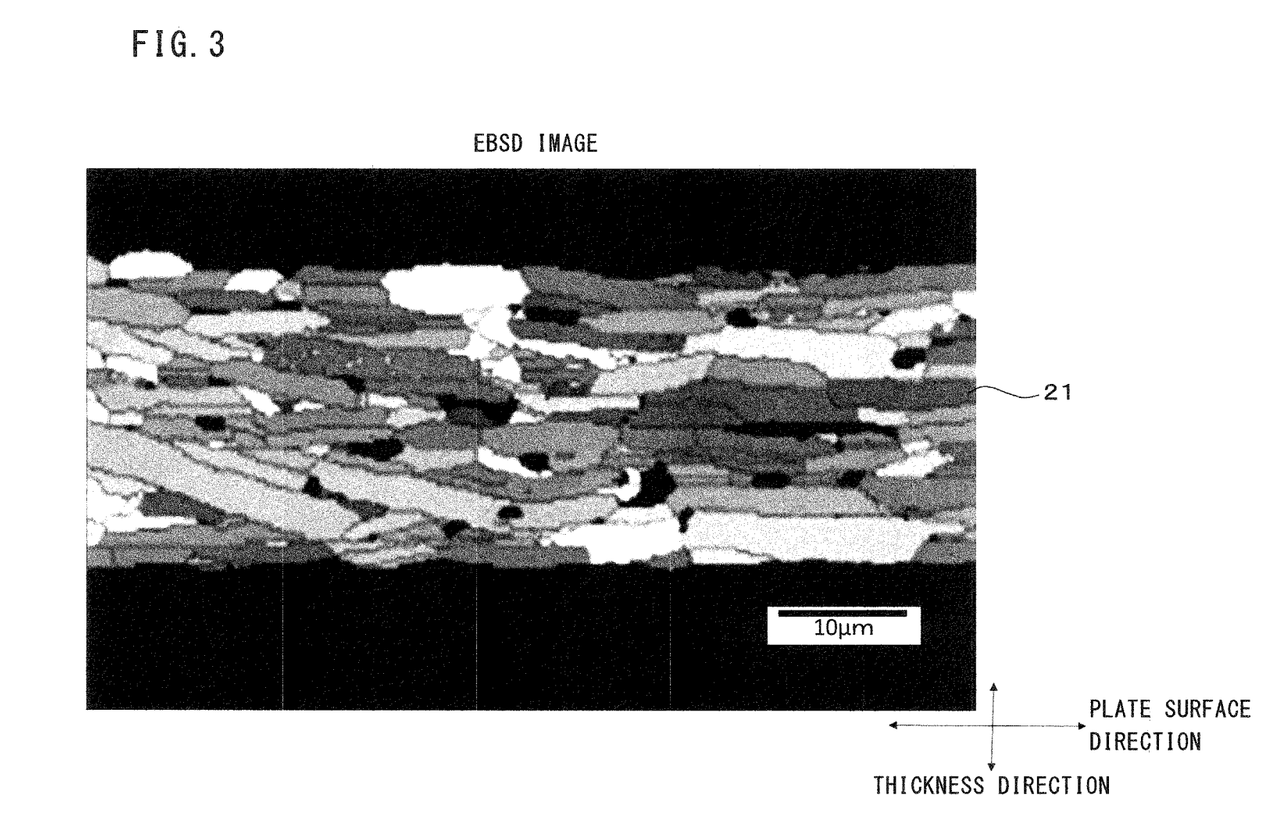
FIG. 3 is a diagram illustrating an EBSD image of a section of the oriented positive electrode plate.
Figure 4:
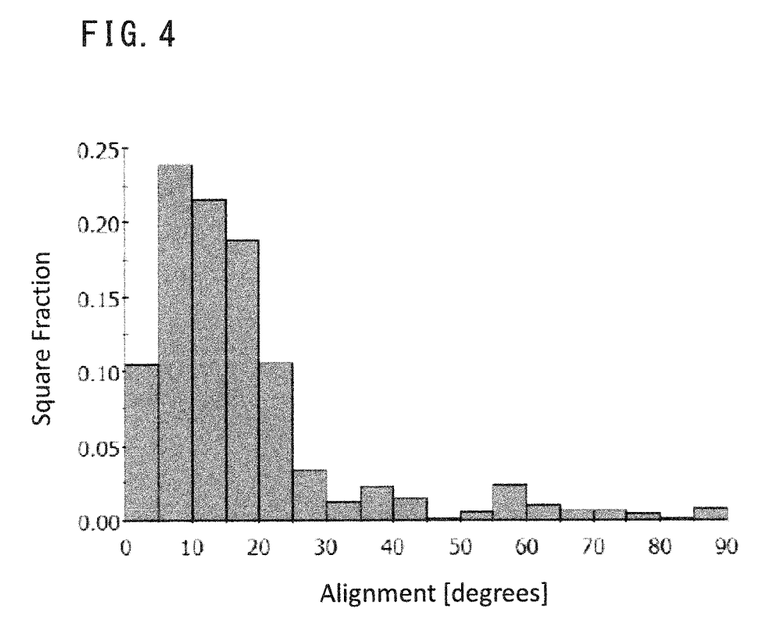
FIG. 4 is a diagram illustrating a histogram showing the angular distribution of orientation of primary particles in the EBSD image.

FIG. 2 is a diagram showing one example of a sectional SEM image perpendicular to the plate surface of the oriented positive electrode plate, and FIG. 3 is a diagram illustrating an electron backscatter diffraction (EBSD) image of a section perpendicular to the plate surface of the oriented positive electrode plate. FIG. 4 is a diagram illustrating a histogram showing the angular distribution of orientation of primary particles 21 in the EBSD image in FIG. 3 on an area basis. Observation of the EBSD image in FIG. 3 shows discontinuities in crystal orientation. In FIG. 3, the orientation angle of each primary particle 21 is expressed by shades of color, and the darker color indicates the smaller orientation angle. The orientation angle as used herein refers to an inclination angle formed by the (003) surface of each primary particle 21 and the plate surface direction. In FIGS. 2 and 3, portions that are displayed in black inside the oriented positive electrode plate correspond to pores.

The oriented positive electrode plate is an oriented sintered body of a plurality of primary particles 21 coupled together. Each primary particle 21 primarily has a plate-like shape, but the primary particles 21 may include those of different shapes such as a rectangular parallelepiped shape, a cubic shape, and a spherical shape. There are no particular limitations on the sectional shape of each primary particle 21, and each primary particle 21 may have a rectangular shape, a polygonal shape other than the rectangular shape, a circular shape, an oval shape, or a complex shape other than the aforementioned shapes.

Each primary particle 21 is composed of a lithium composite oxide. The lithium composite oxide is an oxide expressed as Li$_x$MO$_2$ (0.05<x<1.10, where M is at least one kind of transition metal and typically contains at least one kind of Co, Ni, and Mn). The lithium composite oxide has a layered rock-salt structure. The layered rock-salt structure refers to a crystal structure in which a lithium layer and a layer of transition metal other than lithium are alternately laminated one above the other with a layer of oxygen sandwiched therebetween, i.e., a crystal structure in which a layer of transition metal ions and a single lithium layer are alternately laminated one above the other via oxide ions (typically, an α-NaFeO$_2$-type structure, i.e., a structure in which transition metal and lithium are regularly aligned in the axial direction of a cubic rock-salt structure). Examples of the lithium composite oxide include lithium cobaltate (Li$_x$CoO$_2$), lithium nickelate (Li$_x$NiO$_2$), lithium manganate (Li$_x$MnO$_2$), lithium nickel manganate (Li$_x$NiMnO$_2$), lithium nickel cobaltate (Li$_x$NiCoO$_2$), lithium cobalt nickel manganate (Li$_x$CoNiMnO$_2$), and lithium cobalt manganate (Li$_x$CoMnO$_2$). In particular, lithium cobaltate (Li$_x$CoO$_2$, typically LiCoO$_2$) is preferable. The lithium composite oxide may contain at least one kind of elements selected from the group consisting of Mg, Al, Si, Ca, Ti, V, Cr, Fe, Cu, Zn, Ga, Ge, Sr, Y, Zr, Nb, Mo, Ag, Sn, Sb, Te, Ba, Bi, and W. These elements may be present uniformly within the positive electrode, or may be unevenly distributed on the surface. When present on the surface, the elements may uniformly cover the surface, or may be present in island form. The elements present on the surface are expected to serve to moderate reactions with the electrolytic solution. In this case, the elements are especially preferably Zr, Mg, Ti, or Al.

As illustrated in FIGS. 3 and 4, an average value of the orientation angles of the primary particles 21, i.e., an average orientation angle, is greater than 0° and less than or equal to 30°. This brings about various advantages as follows. Firstly, each primary particle 21 lies down in a direction inclined to the thickness direction, and therefore, the adhesion between primary particles can be improved. This results in an improvement in lithium ion conductivity between a given primary particle 21 and other primary particles 21 that are adjacent to the given primary particle 21 on both sides in the longitudinal direction, and accordingly, rate performance can be improved. Secondly, the rate performance can be further improved. This is because since shrinking and swelling of the oriented positive electrode in the thickness direction, which occur during comings and goings of lithium ions, gain superiority over shrinking and swelling in the plate surface direction, the oriented positive electrode plate can shrink and swell smoothly, and following this the comings and goings of lithium ions also become smooth. Besides, as will be described later, when the positive electrode 2, the separator 41, and the negative electrode 3 are formed into an integral sintered body, the shrinking and swelling of the oriented positive electrode plate in the thickness direction gain superiority as described above. Thus, a shearing force is less likely to occur at the interface of bonding between the oriented positive electrode plate and the separator, and this makes it easy to maintain favorable bonding at this interface.

The average orientation angle of the primary particles 21 is obtained using the following technique. First, three horizontal lines and three vertical lines are drawn in an EBSD image obtained by observing a 95 μm by 125 μm rectangular region at 1000 magnifications as illustrated in FIG. 3, the three horizontal lines dividing the oriented positive electrode plate into quarters in the thickness direction, and the three vertical lines diving the oriented positive electrode plate into quarters in the plate surface direction. Next, an arithmetic mean of the orientation angles of all primary particles 21 that intersect with at least one of the three horizontal lines and the three vertical lines is calculated to obtain the average orientation angle of the primary particles 21. From the viewpoint of further improving the rate performance, the average orientation angle of the primary particles 21 is preferably less than or equal to 30°, and more preferably less than or equal to 25°. From the viewpoint of further improving the rate performance, the average orientation angle of the primary particles 21 is preferably greater than or equal to 2°, and more preferably greater than or equal to 5°.

As illustrated in FIG. 4, the orientation angles of the primary particles 21 may be widely distributed from 0° to 90°, but it is preferable that most of the orientation angles are distributed in a range greater than 0° and less than or equal to 30°. That is, when a section of the oriented sintered body forming the oriented positive electrode plate is analyzed by EBSD, a total area of primary particles 21 (hereinafter, referred to as "low-angle primary particles") whose orientation angles relative to the plate surface of the oriented positive electrode plate are greater than 0° and less than or equal to 30° among all primary particles 21 included in the section used for analysis is preferably 70% or more, and more preferably 80% or more, of the gross area of the primary particles 21 included in the section (specifically, 30 primary particles 21 used to calculate the average orientation angle). This increases the percentage of primary particles 21 with high mutual adhesion and accordingly further improves the rate performance. More preferably, a total area of low-angle primary particles whose orientation angles are less than or equal to 20° is 50% or more of the gross area of the 30 primary particles 21 used to calculate the average orientation angle. Yet more preferably, a total area of low-angle primary particles whose orientation angles are less than or equal to 10° is 15% or more of the gross area of the 30 primary particles 21 used to calculate the average orientation angle.

Since each primary particle 21 mainly has a plate-like shape, a section of each primary particle 21 extends in a predetermined direction and typically forms a generally rectangular shape as illustrated in FIGS. 2 and 3. That is, when a section of the oriented sintered body is analyzed by EBSD, a total area of primary particles 21 that have aspect ratios greater than or equal to 4 among primary particles 21 included in the section used for analysis is preferably 70% or more, and more preferably 80% or more, of the gross area of the primary particles 21 included in the section (specifically, the 30 primary particles 21 used to calculate the average orientation angle). This further improves mutual adhesion of the primary particles 21 and, as a result, further improves the rate performance. The aspect ratio of each primary particle 21 is a value obtained by dividing the maximum Feret's diameter of the primary particle 21 by the minimum Feret's diameter thereof. In the EBSD image used to observe a section, the maximum Feret's diameter is a maximum distance between two parallel straight lines when the primary particle 21 is sandwiched between these two lines. In the EBSD image, the minimum Feret's diameter is a minimum distance between two parallel straight lines when the primary particle 21 is sandwiched between these two lines.

A plurality of primary particles composing the oriented sintered body preferably have a mean particle diameter greater than or equal to 0.5 μm. Specifically, the 30 primary particles used to calculate the average orientation angle preferably have a mean particle diameter greater than or equal to 0.5 μm, more preferably greater than or equal to 0.7 μm, and yet more preferably greater than or equal to 1.0 μm. This reduces the number of grain boundaries among the primary particles 21 in the direction of conduction of lithium ions and improves lithium ion conductivity as a whole. Thus, the rate performance can be further improved. The mean particle diameter of the primary particles 21 is a value obtained as an arithmetical mean of circle equivalent diameters of the primary particles 21. The circle equivalent diameter refers to the diameter of a circle having the same area as the area of each primary particle 21 in the EBSD image.

The positive electrode 2 (e.g., a lithium composite oxide sintered plate) preferably has a porosity of 20 to 60%, more preferably 25 to 55%, yet more preferably 30 to 50%, and especially preferably 30 to 45%. The presence of pores raises expectations of a stress release effect and an increase in capacity, and in the case of the oriented sintered body, further improves mutual adhesion of the primary particles 21 and accordingly further improves the rate performance. The porosity of the sintered body is calculated by polishing a section of the positive electrode plate with a cross-section (CP) polisher, observing the section at 1000 magnifications with an SEM, and binarizing a resultant SEM image. There are no particular limitations on an average circle equivalent diameter of the pores formed in the oriented sintered body, but the average circle equivalent diameter is preferably less than or equal to 8 μm. As the average circle equivalent diameter of the pores becomes smaller, mutual adhesion of the primary particles 21 is further improved and, as a result, the rate performance is further improved. The average circle equivalent diameter of pores is a value obtained as an arithmetical mean of circle equivalent diameters of 10 pores in the EBSD image. The circle equivalent diameter as used herein refers to the diameter of a circle having the same area as the area of each pore in the EBSD image. Each pore formed in the oriented sintered body may be an open pore that is connected to the outside of the positive electrode 2, but it is preferable that each pore does not come through the positive electrode 2. Note that each pore may be a closed pore.

The positive electrode 2 (e.g., a lithium composite oxide sintered plate) preferably has a mean pore diameter of 0.1 to 10.0 μm, more preferably 0.2 to 5.0 μm, and yet more preferably 0.3 to 3.0 μm. If the mean pore diameter is within the aforementioned range, it is possible to suppress the occurrence of stress concentration in local fields of large pores and to easily release stress uniformly in the sintered body.

The positive electrode 2 preferably has a thickness of 60 to 450 µm, more preferably 70 to 350 µm, and yet more preferably 90 to 300 µm. If the thickness is within this range, it is possible to increase the capacity of the active material per unit area and improve the energy density of the coin-type secondary cell 1 and to suppress degradation of cell characteristics (especially, an increase in resistance value) accompanying the repetition of charging and discharging.

The negative electrode 3 is, for example, a plate-like sintered body. The fact that a sintered body is used as the negative electrode 3 means that the negative electrode 3 contains neither binders nor conductive assistants. This is because even if a green sheet contains a binder, the binder will be destroyed or burnt down during firing. Using a sintered body as the negative electrode 3 allows the negative electrode 3 to ensure heat resistance during reflow soldering. Besides, the negative electrode 3 that includes no binders increases packaging density of the negative active material (e.g., LTO or $Nb_2TiO_7$, which will be described later) and provides high capacity and favorable charge and discharge efficiency. The negative electrode 3 is preferably porous, i.e., preferably has pores.

A preferable negative electrode 3 is a titanium-containing sintered plate. The titanium-containing sintered plate preferably contains lithium titanate ($Li_4Ti_5O_{12}$; hereinafter, referred to as "LTO") or niobium titanium composite oxide ($Nb_2TiO_7$), and more preferably contains LTO. Although LTO is typically known to have a spinel structure, a different structure may be employed during charging and discharging. For example, reactions progress while LTO contains both $Li_4Ti_5O_{12}$ (spinel structure) and $Li_7Ti_5O_{12}$ (rock-salt structure), i.e., two phases coexist, during charging and discharging. Accordingly, LTO is not limited to having a spinel structure. An LTO sintered plate may be fabricated in accordance with, for example, the method described in Document 4 above (Japanese Patent Application Laid-Open No. 2015-185337). The negative electrode 3 may contain a lithium composite oxide other than LTO. Although in the following description, a titanium-containing sintered plate is used as the negative electrode 3, the negative electrode 3 may be an electrode of a different type depending on the design of the coin-type secondary cell 1. One example of such a different negative electrode 3 is a powder dispersed-type negative electrode (so-called coating electrode) produced by applying and drying a negative electrode mixture that contains, for example, a negative active material, a conductive assistant, and a binder.

The titanium-containing sintered plate described above has a structure in which a plurality of (i.e., a large number of) primary particles are coupled together. Accordingly, it is preferable that these primary particles are composed of LTO or $Nb_2TiO_7$.

The negative electrode 3 preferably has a thickness of 70 to 500 µm, more preferably 85 to 400 µm, and yet more preferably 95 to 350 µm. The LTO sintered plate with a greater thickness facilitates implementation of the cell with higher capacity and higher energy density. The thickness of the negative electrode 3 is obtained by, for example, measuring the distance between the plate surfaces observed generally in parallel, when a section of the negative electrode 3 is observed with a scanning electron microscope (SEM).

A mean particle diameter of a plurality of primary particles composing the negative electrode 3, i.e., a primary particle diameter, is preferably less than or equal to 1.2 µm, more preferably in the range of 0.02 to 1.2 µm, and yet more preferably in the range of 0.05 to 0.7 µm. The primary particle diameter within the aforementioned range facilitates achieving both lithium ion conductivity and electron conductivity and contributes to an improvement in rate performance.

The negative electrode 3 preferably has pores. The negative electrode 3 with pores, especially with open pores, allows penetration of the electrolytic solution into the negative electrode 3 when the negative electrode 3 is incorporated in the cell, and as a result, improves lithium ion conductivity. The reason for this is that, among two types of lithium ion conduction in the negative electrode 3, namely, conduction through constituent particles of the negative electrode 3 and conduction through the electrolytic solution in pores, the conduction through the electrolytic solution in pores is predominantly faster than the other.

The negative electrode 3 preferably has a porosity of 20 to 60%, more preferably 30 to 55%, and yet more preferably 35 to 50%. The porosity within this range facilitates achieving both lithium ion conductivity and electron conductivity and contributes to an improvement in rate performance.

The negative electrode 3 has a mean pore diameter of, for example, 0.08 to 5.0 µm, preferably 0.1 to 3.0 µm, and more preferably 0.12 to 1.5 µm. The mean pore diameter within this range facilitates achieving both lithium ion conductivity and electron conductivity and contributes to an improvement in rate performance.

In the coin-type secondary cell 1 in FIG. 1, the electrolyte layer 4 includes a separator 41 and the electrolytic solution 42 described previously. The separator 41 is provided between the positive electrode 2 and the negative electrode 3. The separator 41 is porous and principally impregnated with the electrolytic solution 42. When the positive electrode 2 and the negative electrode 3 are porous, the positive electrode 2 and the negative electrode 3 are also impregnated with the electrolytic solution 42. The separator 41 preferably has a thickness of 3 to 50 µm, more preferably 5 to 40 µm, and yet more preferably 10 to 30 µm. The separator 41 also has a porosity of 30 to 90%, and more preferably 40 to 80%.

In principle, the separator 41 is made of a material that does not contain lithium. The separator 41 is preferably made of cellulose or ceramic. A cellulose separator is advantageous in terms of low cost and excellent heat resistance. The cellulose separator is also widely used. Unlike a polyolefin separator inferior in heat resistance, the cellulose separator not only has excellent heat resistance in itself but also has excellent wettability to γ-butyrolactone (GBL) that is a constituent part of the electrolytic solution with excellent heat resistance. Thus, in the case of using an electrolytic solution that contains GBL, the separator can be impregnated enough with the electrolytic solution (without rejection).

On the other hand, a separator made of ceramic (hereinafter, also referred to as a "ceramic separator"), of course, has excellent heat resistance and also has the advantage of being able to be fabricated together with the positive electrode 2 and the negative electrode 3 into a single integral sintered body as a whole. In the case of the ceramic separator, ceramic composing the separator is preferably of at least one kind selected from the group consisting of MgO, $Al_2O_3$, $ZrO_2$, SiC, $Si_3N_4$, AlN, and cordierite, and more preferably of one kind selected from the group consisting of MgO, $Al_2O_3$, and $ZrO_2$. In the case of fabricating the aforementioned integral sintered body, the ceramic separator may contain a glass component from the viewpoint of improving adhesion between the positive electrode 2 and the negative electrode 3. The mass ratio of the glass component to the mass of the ceramic separator as a whole is preferably in the range of 0.1 to 50% by mass, more preferably in the range of 0.5 to 40% by mass, and yet more preferably in the range of 0.5 to 30% by mass. The addition of the glass component to the ceramic separator is preferably implemented by adding glass frit to raw powder of the ceramic separator. Alternatively, the ceramic separator may not contain the glass component, depending on the degree of adhesion between the ceramic separator and the positive and negative electrodes 2 and 3.

Assuming an assembly of the positive electrode 2, the separator 41, and the negative electrode 3 as an "electrode unit," the positive electrode 2 and the negative electrode 3 may become misaligned relative to each other in such an electrode unit that is configured by superimposing the positive electrode 2, the separator 41 (e.g., a separator made of cellulose or ceramic), and the negative electrode 3, each having been produced individually, one above another (this electrode unit is hereinafter referred to as an "assembled electrode unit"). In this case, the coin-type secondary cell 1 exhibits lower performance (e.g., capacity) than expected.

On the other hand, an electrode unit that is configured as an integral sintered body of the positive electrode 2, the ceramic separator 41, and the negative electrode 3 by stamping a green sheet with a three-layer configuration, which is to form the positive electrode 2, the ceramic separator 41, and the negative electrode 3, into a predetermined shape and firing the stamped green sheet (this electrode unit is hereinafter referred to as an "integral-type electrode unit") can reduce the relative misalignment between the positive electrode 2 and the negative electrode 3. As a result, high cell performance as expected (i.e., close to a theoretical capacity) can be achieved. When viewed in the direction of lamination, the percentage of misalignment between areas obtained from $[(S_p+S_n)/S_{pn}] \times 100$ is preferably less than 1%, and more preferably less than 0.5%, where $S_{pn}$ is the area of the region of overlap between the positive electrode 2 and the negative electrode 3, $S_p$ is the area of the region of the positive electrode 2 that extends off the negative electrode 3, and Sn is the area of the region of the negative electrode 3 that extends off the positive electrode 2. In the sintered body described above, the positive electrode 2, the ceramic separator 41, and the negative electrode 3 are bonded together by sintering, and after the bonding, no misalignment will occur between the positive electrode 2 and the negative electrode 3. Besides, it is also possible to reduce waviness and warpage of the positive electrode 2 and the negative electrode 3.

There are no particular limitations on the electrolytic solution 42, and a commercially available electrolytic solution for lithium cells may be used, such as a solution obtained by dissolving lithium salt in a nonaqueous solvent such as an organic solvent. In particular, an electrolytic solution with excellent heat resistance is preferable, and such an electrolytic solution preferably contains lithium borofluoride ($LiBF_4$) in a nonaqueous solvent. In this case, a preferable nonaqueous solvent is of at least one kind selected from the group consisting of γ-butyrolactone (GBL), ethylene carbonate (EC), and propylene carbonate (PC), more preferably one of a mixed solvent containing EC and GBL, a single solvent containing PC, a mixed solvent containing PC and GBL, and a single solvent containing GBL, and especially preferably a mixed solvent containing EC and GBL or a single solvent containing GBL. By containing γ-butyrolactone (GBL), the nonaqueous solvent has a higher boiling point, which results in a significant improvement in heat resistance. From this viewpoint, the volume ratio of EC and GBL in a nonaqueous solvent that contains EC and/or GBL is preferably in the range of 0:1 to 1:1 (GBL ratio: 50 to 100% by volume), more preferably in the range of 0:1 to 1:1.5 (GBL ratio: 60 to 100% by volume), yet more preferably in the range of 0:1 to 1:2 (GBL ratio: 66.6 to 100% by volume), and especially preferably in the range of 0:1 to 1:3 (GBL ratio: 75 to 100 percent by volume). Lithium borofluoride ($LiBF_4$) dissolved in the nonaqueous solvent is an electrolyte having a high decomposition temperature, which also results in a significant improvement in heat resistance. The concentration of $LiBF_4$ in the electrolytic solution 42 is preferably in the range of 0.5 to 2 mol/l, more preferably in the range of 0.6 to 1.9 mol/l, yet more preferably in the range of 0.7 to 1.7 mol/l, and especially preferably in the range of 0.8 to 1.5 mol/l.

The electrolytic solution 42 may further contain vinylene carbonate (VC) and/or fluoroethylene carbonate (FEC) and/or vinylethylene carbonate (VEC) as additives. Both VC and FEC have excellent heat resistance. Accordingly, as a result of the electrolytic solution 42 containing such additives, an SEI film with excellent heat resistance can be formed on the surface of the negative electrode 3.

The cell case 5 in FIG. 1 typically includes the positive electrode can 51, the negative electrode can 52, and a gasket 53. The positive electrode can 51 has the flat plate portion 511 and a peripheral wall portion 512. The flat plate portion 511 has a disk-like shape. The peripheral wall portion 512 protrudes from the outer peripheral edge of the flat plate portion 511. The positive electrode can 51 is a container that houses the positive electrode 2. The negative electrode can 52 has the flat plate portion 521 and a peripheral wall portion 522. The flat plate portion 521 has a disk-like shape. The peripheral wall portion 522 protrudes from the outer peripheral edge of the flat plate portion 521. The negative electrode can 52 is a container that houses the negative electrode 3. In the coin-type secondary cell 1, the negative electrode can 52 is arranged relative to the positive electrode can 51 so that the negative electrode 3 faces the positive electrode 2 with the separator 41 sandwiched therebetween. The positive electrode can 51 and the negative electrode can 52 are made of metal. For example, the positive electrode can 51 and the negative electrode can 52 are formed by press-working (drawing) of a metal plate such as a stainless steel plate or an aluminum plate.

In the coin-type secondary cell 1 in FIG. 1, the peripheral wall portion 512 of the positive electrode can 51 is arranged outward of the peripheral wall portion 522 of the negative electrode can 52. The gasket 53 is a ring-shaped member having insulating properties and provided between the peripheral wall portion 512 and the peripheral wall portion 522. The positive electrode can 51 is fixed to the negative electrode can 52 via the gasket 53 by subjecting the peripheral wall portion 512 arranged on the outer side to plastic deformation, i.e., swaging the peripheral wall portion 512. This forms the aforementioned enclosed space. In the coin-type secondary cell 1, the peripheral wall portion 522 of the negative electrode can 52 may be arranged outward of the peripheral wall portion 512 of the positive electrode can 51. Preferably, the gasket 53 is also filled in spaces, for example, between the peripheral wall portion 522 on the inner side and the positive electrode 2. The gasket 53 is made of, for example, an insulating resin such as polypropylene, polytetrafluoroethylene, polyphenylene sulfide, perfluoroalkoxy alkane, or polychlorotrifluoroethylene. Among the above examples, polyphenylene sulfide or perfluoroalkoxy alkane with excellent heat resistance is more preferable. The gasket 53 may also be a member made of a different insulating material.

The positive electrode can 51 and the negative electrode can 52 each have a plate thickness of, for example, 0.075 to 0.25 mm. Reducing the plate thicknesses of the positive electrode can 51 and the negative electrode can 52 in this way facilitates ensuring a certain degree of thickness for the positive electrode 2 and the negative electrode 3 in the low-profile coin-type secondary cell 1 and increasing the capacity of the cell. The coin-type secondary cell 1 with a low percentage of lithium carbonate in the electrodes is capable of adopting the positive and negative electrode cans 51 and 52 of small plate thicknesses, because it is possible to reduce the possibility of lithium carbonate reacting with, for example, the electrolytic solution and yielding a gas during reflow soldering.

The coin-type secondary cell 1 preferably further includes a positive current collector 62 and/or a negative current collector 63. There are no particular limitations on the positive current collector 62 and the negative current collector 63, but they are preferably metal foil such as copper foil or aluminum foil. The positive current collector 62 is preferably arranged between the positive electrode 2 and the positive electrode can 51, and the negative current collector 63 is preferably arranged between the negative electrode 3 and the negative electrode can 52. From the viewpoint of reducing contact resistance, a positive carbon layer 621 is preferably provided between the positive electrode 2 and the positive current collector 62. Similarly, from the viewpoint of reducing contact resistance, a negative carbon layer 631 is preferably provided between the negative electrode 3 and the negative current collector 63. The positive carbon layer 621 and the negative carbon layer 631 are both preferably formed of conductive carbon, and for example, may be formed by applying a conductive carbon paste by screen printing or other techniques. As another technique, metal or carbon may be formed by sputtering on the current collecting surfaces of the electrodes. Examples of the metal species include Au, Pt, and Al.

Method of Fabricating Positive Electrode in Assembled Electrode Unit

A preferable positive electrode 2, i.e., a lithium composite oxide sintered plate, may be fabricated by any method, and as an example, fabricated through processing, including (a) production of a lithium composite oxide-containing green sheet, (b) production of an excess lithium source-containing green sheet, which is conducted when required, and (c) lamination and firing of the green sheet(s).

(a) Production of Lithium Composite Oxide-Containing Green Sheet

First, raw powder of a lithium composite oxide is prepared. This powder preferably contains synthesized plate-like particles with composition $LiMO_2$, where M is as described previously (e.g., $LiCoO_2$ plate-like particles). The D50 particle size by volume of the raw powder is preferably in the range of 0.3 to 30 μm. For example, a method of producing $LiCoO_2$ plate-like particles is conducted as follows. First, $LiCoO_2$ powder is synthesized by mixing and firing $Co_3O_4$ raw powder and $Li_2CO_3$ raw powder (at a temperature of 500 to 900° C. for 1 to 20 hours). The resultant $LiCoO_2$ powder is pulverized to a D50 particle size by volume of 0.2 μm to 10 μm in a pot mill, so as to obtain plate-like $LiCoO_2$ particles capable of conducting lithium ions in parallel with a plate surface. Such $LiCoO_2$ particles may also be obtained by techniques for inducing grain growth of a green sheet using $LiCoO_2$ powder slurry and then cracking the sheet or by techniques for synthesizing plate-like crystals, such as a flux method, hydrothermal synthesis, single crystal breeding using a melt, or a sol-gel method. The resultant $LiCoO_2$ particles are likely to cleave along a cleavage plane. By cracking and cleaving the $LiCoO_2$ particles, $LiCoO_2$ plate-like particles are produced.

The aforementioned plate-like particles may be used singly as raw powder, or mixed powder obtained by mixing the aforementioned plate-like powder and other raw powder (e.g., $Co_3O_4$ particles) may be used as raw powder. In the latter case, it is preferable that the plate-like powder is caused to function as template particles for providing orientation, and the other raw powder (e.g., $Co_3O_4$ particles) is caused to function as matrix particles that are capable of growing along the template particles. In this case, powder obtained by mixing the template particles and the matrix particles in the ratio of 100:0 to 3:97 is preferably used as the raw powder. In the case of using $Co_3O_4$ raw powder as matrix particles, there are no particular limitations on the D50 particle size by volume of the $Co_3O_4$ raw powder, and for example, the D50 particle size may be set in the range of 0.1 to 1.0 μm, which is preferably smaller than the D50 particle size by volume of $LiCoO_2$ template particles. The matrix particles may also be obtained by subjecting a $Co(OH)_2$ raw material to heat treatment conducted at a temperature of 500° C. to 800° C. for 1 to 10 hours. As the matrix particles, $Co(OH)_2$ particles or $LiCoO_2$ particles may be used, in addition to $Co_3O_4$.

In the case where the raw powder is composed of 100% $LiCoO_2$ template particles or in the case where $LiCoO_2$ particles are used as matrix particles, a large-sized (e.g., 90 mm×90 mm in square) and flat $LiCoO_2$ sintered plate can be obtained by firing. This mechanism remains uncertain, but it can be expected that the volume is unlikely to change during firing or local variations in volume are unlikely to occur because the firing process does not involve synthesis into $LiCoO_2$.

The raw powder is mixed with a dispersion medium and various additives (e.g., a binder, a plasticizer, and a dispersant) to form slurry. For the purpose of accelerating grain growth or compensating for the amount of volatilization during a firing process, which will be described later, a lithium compound (e.g., lithium carbonate) other than $LiMO_2$ may be added by an excessive amount of approximately 0.5 to 30 mol % to the slurry. It is preferable that no pore-forming materials are added to the slurry. The slurry is preferably stirred and deaerated under reduced pressure and adjusted to have a viscosity of 4000 to 10000 cP. Resultant slurry is molded into sheet form to obtain a lithium composite oxide-containing green sheet. The green sheet obtained in this way is an independent sheet-like body. The independent sheet (also referred to as a "self-supported film") as used herein refers to a sheet that is independent of other supports and that can be handled separately (including a thin piece with an aspect ratio greater than or equal to 5). That is, the independent sheet does not include such a sheet that is fixedly attached to other supports (e.g., a board) and integrated with the supports (i.e., that is impossible or difficult to separate). The sheet molding is preferably conducted using a molding technique that enables the application of a shearing force to plate-like particles (e.g., template particles) in the raw powder. This enables the average inclination angle of the primary particles relative to the plate surface to be kept greater than 0° and less than or equal to 30°. As the molding technique that enables the application of a shearing force to plate-like particles, doctor blading is preferable. The thickness of the lithium composite oxide-containing green sheet may be appropriately set so as to become a desired thickness as described above after firing.

(b) Production of Excess Lithium Source-Containing Green Sheet (Arbitrary Process)

Besides the above-described lithium composite oxide-containing green sheet, an excess lithium source-containing green sheet may be produced when required. This excess lithium source is preferably a lithium compound, other than $LiMO_2$, whose components other than Li are destroyed by firing. A preferable example of such a lithium compound (excess lithium source) is lithium carbonate. The excess lithium source is preferably in powder form, and the D50 particle size by volume of the excess lithium source powder is preferably in the range of 0.1 to 20 μm, and more preferably in the range of 0.3 to 10 μm. Then, the lithium source powder is mixed with a dispersion medium and various additives (e.g., a binder, a plasticizer, and a dispersant) to form slurry. The resultant slurry is preferably stirred and deaerated under reduced pressure and adjusted to have a viscosity of 1000 to 20000 cP. Resultant slurry is molded into sheet form to obtain an excess lithium source-containing green sheet. The green sheet obtained in this way is also an independent sheet-like body. The sheet molding may be conducted by various known methods, and doctor blading is preferable. The thickness of the excess lithium source-containing green sheet is preferably set to a thickness that allows a molar ratio of the Li content in the excess lithium source-containing green sheet to the Co content in the lithium composite oxide-containing green sheet (i.e., Li/Co ratio) to become preferably higher than or equal to 0.1 and more preferably in the range of 0.1 to 1.1.

(c) Lamination and Firing of Green Sheet(s)

The lithium composite oxide-containing green sheet (e.g., $LiCoO_2$ green sheet), and when desired, the excess lithium source-containing green sheet (e.g., $Li_2CO_3$ green sheet) are placed in order on a lower setter, and an upper setter is further placed thereon. The upper and lower setters are made of ceramic, and preferably made of zirconia or magnesia. When the setters are made of magnesia, pores tend to be smaller. The upper setter may have a porous structure or a honeycomb structure, or may have a dense compact structure. If the upper setter is dense and compact, pores in the sintered plate tend to be smaller and the number of pores tends to increase. The excess lithium source-containing green sheet is preferably used as necessary by being cut to a size that allows the molar ratio of the Li content in the excess lithium source-containing green sheet to the Co content in the lithium composite oxide-containing green sheet (i.e., Li/Co ratio) to become preferably higher than or equal to 0.1 and more preferably in the range of 0.1 to 1.1.

At the stage of placement of the lithium composite oxide-containing green sheet (e.g., $LiCoO_2$ green sheet) on the lower setter, this green sheet may be degreased when required and then calcined at a temperature of 600 to 850° C. for 1 to 10 hours. In this case, the excess lithium source-containing green sheet (e.g., $Li_2CO_3$ green sheet) and the upper setter may be placed in this order on a resultant calcined plate.

Then, the aforementioned green sheet(s) and/or the calcined plate, which are sandwiched between the setters, are degreased when required and subjected to heat treatment (firing) at a firing temperature of a medium temperature range (e.g., 700 to 1000° C.) so as to obtain a lithium composite oxide sintered plate. This firing process may be divided into two sub-steps, or may be conducted at once. In the case where firing is performed in two steps, the first firing temperature is preferably lower than the second firing temperature. The sintered plate obtained in this way is also an independent sheet-like plate.

Method of Fabricating Negative Electrode in Assembled Electrode Unit

A preferable negative electrode 3, i.e., a titanium-containing sintered plate, may be fabricated by any method. For example, an LTO sintered plate is preferably fabricated through processing including (a) production of an LTO-containing green sheet and (b) firing of the LTO-containing green sheet.

(a) Production of LTO-Containing Green Sheet

First, raw powder (LTO powder) of lithium titanate $Li_4Ti_5O_{12}$ is prepared. This raw powder may be commercially available LTO powder, or may be newly synthesized powder. For example, the raw powder may be obtained by hydrolysis of a mixture of titanium tetraisopropoxy alcohol and isopropoxy lithium, or may be obtained by firing a mixture that contains, for example, lithium carbonate and titania. The D50 particle size by volume of the raw powder is preferably in the range of 0.05 to 5.0 μm, and more preferably in the range of 0.1 to 2.0 μm. When the particle sizes of the raw powder are large, pores tend to be larger. When the particle sizes of the raw material are large, pulverization processing (e.g., pot milling, bead milling, jet milling) may be performed to obtain desired particle sizes. Then, the raw powder is mixed with a dispersion medium and various additives (e.g., a binder, a plasticizer, and a dispersant) to form slurry. For the purpose of accelerating grain growth or compensating for the amount of volatilization during a firing process, which will be described later, a lithium compound (e.g., lithium carbonate) other than LTO may be added by an excessive amount of approximately 0.5 to 30 mol % to the slurry. The slurry is preferably stirred and deaerated under reduced pressure and adjusted to have a viscosity of 4000 to 10000 cP. Resultant slurry is molded into sheet form so as to obtain an LTO-containing green sheet. The green sheet obtained in this way is an independent sheet-like body. The independent sheet (also referred to as a "self-supported film") as used herein refers to a sheet that is independent of other supports and that can be handled separately (including a thin piece with an aspect ratio greater than or equal to 5). That is, the independent sheet does not include such a sheet that is fixedly attached to other supports (e.g., a board) and integrated with the supports (i.e., that is impossible or difficult to separate). The sheet molding may be conducted by various known methods, and doctor blading is preferable. The thickness of the LTO-containing green sheet may be appropriately set so as to become a desired thickness as described above after firing.

(b) Firing of LTO-Containing Green Sheet

The LTO-containing green sheet is placed on a setter. The setter is made of ceramic, and preferably made of zirconia or magnesia. The setter preferably has undergone embossing. The green sheet placed on the setter is inserted into a sheath. The sheath is also made of ceramic, and preferably made of alumina. Then, in this state, the green sheet is degreased when required and then fired so as to obtain an LTO sintered plate. This firing is preferably conducted at a temperature of 600 to 900° C. for 0.1 to 50 hours, and more preferably at a temperature of 700 to 800° C. for 0.3 to 20 hours. The sintered plate obtained in this way is also an independent sheet-like plate. The rate of temperature rise during the firing is preferably in the range of 100 to 1000° C./h, and more preferably in the range of 100 to 600° C./h. In particular, this rate of temperature rise is preferably adopted during the process of temperature rise from 300° C.

to 800° C., and more preferably during the process of temperature rise from 400° C. to 800° C.

(c) Summary

As described above, the LTO sintered plate can be fabricated in a favorable manner. In this preferable fabrication method, 1) adjusting the particle size distribution for the LTO powder and/or 2) changing the rate of temperature rise during firing are effective, and they are considered to contribute to implementation of various characteristics of the LTO sintered plate.

Method of Fabricating Integral-Type Electrode Unit

The integral-type electrode unit (integral sintered body) having a three-layer configuration including the positive electrode 2, the ceramic separator 41, and the negative electrode 3 may be fabricated by any method, and preferably fabricated through processing including (1) production of green sheets that correspond respectively to the three layers; and (2) lamination, pressure bonding, and firing of these green sheets.

(1) Production of Various Green Sheets (1a) Production of Positive-Electrode Green Sheet The production of a positive-electrode green sheet is, for example, the same as "(a) production of a lithium composite oxide-containing green sheet" in the above-described "method of fabricating a positive electrode in an assembled electrode unit." Of course, the positive-electrode green sheet may be fabricated using other techniques.

(1b) Production of Negative-Electrode Green Sheet

The production of a negative-electrode green sheet is, for example, the same as "(a) production of an LTO-containing green sheet" in the above-described "method of fabricating a negative electrode in an assembled electrode unit." Of course, the negative-electrode green sheet may be fabricated using other techniques, and may be a different green sheet other than the LTO-containing green sheet.

(1c) Production of Separator Green Sheet

The production of a separator green sheet can be conducted as follows. First, ceramic powder of at least one kind selected from the group consisting of MgO, $Al_2O_3$, $ZrO_2$, SiC, $Si_3N_4$, AlN, and cordierite is prepared. The ceramic powder may have glass frit added thereto. The D50 particle size by volume of the raw powder is preferably in the range of 0.05 to 20 μm, and more preferably in the range of 0.1 to 10 μm. When the particle sizes of the raw powder are large, pores tend to be larger. When the particle sizes of the raw material are large, pulverization processing (e.g., pot milling, bead milling, jet milling) may be performed to obtain desired particle sizes. Then, the raw powder is mixed with a dispersion medium and various additives (e.g., a binder, a plasticizer, and a dispersant) to form slurry. It is preferable that no pore-forming materials are added to the slurry. The slurry is preferably stirred and deaerated under reduced pressure and adjusted to have a viscosity of 4000 to 10000 cP. Resultant slurry is molded into sheet form to obtain a separator green sheet. The sheet molding is preferably conducted by various known methods, and doctor blading is preferable. The thickness of the separator green sheet may be appropriately set so as to become a desired thickness as described above after firing.

(2) Lamination, Pressure Bonding, and Firing of Green Sheets

Next, the positive-electrode green sheet, the separator green sheet, and the negative-electrode green sheet are laminated one above another in order, and a resultant laminate is pressed to bond the green sheets onto one another. There are no particular limitations on pressing as long it is conducted using a commonly known technique, and cold isostatical press (CIP) is preferably used. A preferable press pressure is in the range of 10 to 5000 kgf/cm$^2$, and more preferably in the range of 50 to 3000 kgf/cm$^2$. The green sheet laminate bonded in this way is preferably stamped into a desired shape (e.g., a coin shape) and size, using a stamping die. This eliminates misalignment between the positive electrode 2 and the negative electrode 3 in an integral-type electrode unit in a final form. As a result, the end faces of the positive and negative electrodes 2 and 3 are aligned, and accordingly, the capacity of the cell is maximized.

The resultant green sheet laminate is place on a setter. The setter is made of ceramic, and preferably made of zirconia or magnesia. The setter preferably has undergone embossing. The green sheet placed on the setter is inserted into a sheath. The sheath is also made of ceramic, and preferably made of alumina. Then, in this state, the laminate is degreased as necessary and then fired so as to obtain an integral-type electrode unit. The degreasing is preferably conducted by holding the laminate at a temperature of 300 to 600° C. for 0.5 to 20 hours. The firing is preferably conducted at a temperature of 650 to 900° C. for 0.01 to 20 hours, and more preferably at a temperature of 700 to 850° C. for 0.5 to 10 hours. The rate of temperature rise during firing is preferably in the range of 50 to 1500° C./h, and more preferably in the range of 200 to 1300° C./h. In particular, this rate of temperature rise is preferably adopted in the process of temperature rise from 600 to 900° C., and more preferably in the process of temperature rise from 600 to 800° C. In this way, the integral-type electrode unit having a three-layer configuration including the positive electrode 2, the ceramic separator 41, and the negative electrode 3 is obtained. Note that, if the stamping has not been conducted at the stage of the aforementioned green sheet laminate, misalignment may occur between the positive electrode 2 and the negative electrode 3 in the integral-type electrode unit in a final form. In this case, it is preferable that the end faces of the integral-type electrode unit are subjected to finishing processing using techniques such as laser machining, cutting, and polishing so as to minimize the aforementioned misalignment. As a result, the end faces of the positive and negative electrodes 2 and 3 are aligned, and accordingly, the capacity of the cell is maximized.

Circuit Board Assembly

Figure 5:
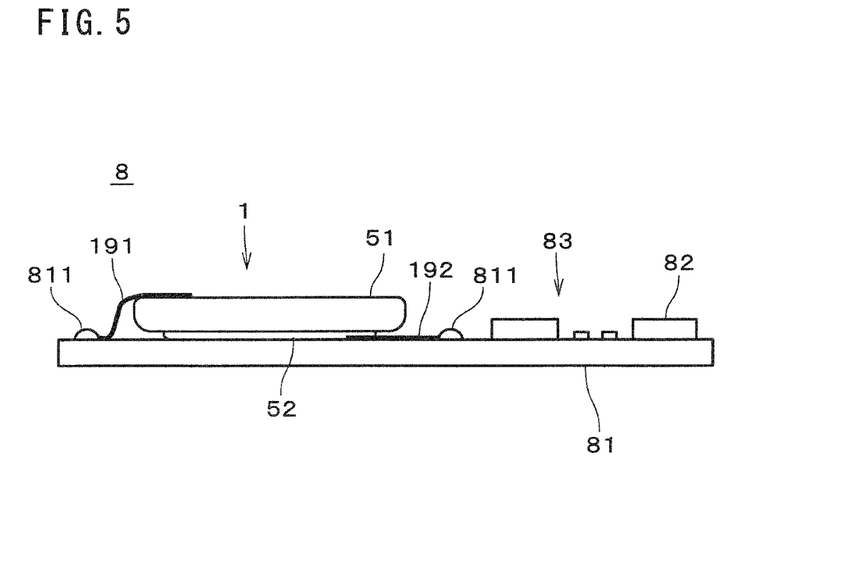
FIG. 5 is a side view of a circuit board assembly.

FIG. 5 is a side view of a circuit board assembly 8 that includes the above-described coin-type secondary cell 1. The circuit board assembly 8 further includes a wiring board 81, a wireless communication device 82, and other electronic components 83. The wiring board 81 is a so-called printed circuit board and has an upper surface with conductive wiring. The wiring may be provided inside the wiring board 81 or on the lower surface of the wiring board 81. Although only a single wiring board 81 is illustrated in FIG. 5, the wiring board 81 may be structured by assembling a plurality of partial wiring boards.

The coin-type secondary cell 1 is fixed to the wiring board 81 in such a posture that its negative electrode can 52 faces the wiring board 81. The coin-type secondary cell 1 has its positive electrode can 51 electrically connected in advance to a lead 191, and its negative electrode can 52 electrically connected in advance to a lead 192. End portions of the leads 191 and 192 that are the farthest away from the coin-type secondary cell 1 are connected with solder 811 to the wiring of the wiring board 81. The connections between the wiring and the leads 191 and 192 are established by soldering by reflow method. In other words, the coin-type secondary cell 1 is electrically connected to the wiring board 81 by reflow soldering. The coin-type secondary cell 1 may be fixed to the wiring board 81 in such a posture that its positive electrode can 51 faces the wiring board 81.

The wireless communication device 82 is an electric circuit module including antennas and communication circuits. Terminals of the wireless communication device 82 are connected with solder to the wiring of the wiring board 81. The connections between the wiring and the terminals of the wireless communication device 82 are established by soldering by reflow method. In other words, the wireless communication device 82 is electrically connected to the wiring board 81 by reflow soldering. The wireless communication device 82 is a device that performs communication via radio waves. The wireless communication device 82 may be a device dedicated for transmission, or may be a device capable of both transmission and reception.

The other electronic components 83 mounted on the wiring board 81 appropriately include, for example, a circuit that generates signals to be transmitted, a circuit that processes received signals, sensors, various measuring devices, and terminals that receive input of signals from the outside.

The circuit board assembly 8 is preferably used as part of an IoT device. The term "IoT" is an abbreviation of "Internet of Things," and the "IoT device" as used herein refers to any kind of devices that are connected to the Internet and exhibit specific functions.

A process has conventionally been performed, in which a socket is mounted on a wiring board by reflow soldering, and then a coin-type secondary cell is placed in the socket. In the circuit board assembly 8, the coin-type secondary cell 1 is mounted on the wiring board 81 by reflow soldering, so that the mounting process can be simplified. Preferably, there are no electronic components that are placed on the wiring board 81 after the reflow soldering. This simplifies handling of the circuit board assembly 8 after the reflow soldering. Here, the language "placed after the reflow soldering" as used herein does not include connecting external wiring to the circuit board. More preferably, electrical connection between the wiring of the wiring board 81 and all electronic components connected to the wiring is established by reflow soldering on the wiring board 81. This processing can be implemented by mounting the coin-type secondary cell 1 on the wiring board 81 by reflow soldering.

EXAMPLES

Next, examples will be described. Here, coin-type secondary cells according to Examples 1 to 5 and Comparative Example 1 shown in Table 1 were produced and evaluated. In the following description, $LiCoO_2$ is abbreviated as "LCO," and $Li_4Ti_5O_{12}$ is abbreviated as "LTO."

TABLE 1

|  | Type of Electrode Unit | Percentage of Lithium Carbonate in Electrodes (% by mass) | Ratio of Capacities Before and After Reflow Test |
| --- | --- | --- | --- |
| Example 1 | Assembled | 0.2 | 95% |
| Example 2 | Integral | 0.2 | 95% |
| Example 3 | Integral | 2.5 | 85% |
| Example 4 | Integral | 0.003 | 90% |
| Example 5 | Integral | 0.001 | 60% |
| Comparative Example 1 | Integral | 5.0 | 20% |

Example 1

(1) Production of Positive Electrode

First, $Co_3O_4$ powder (produced by Seido Chemical Industry Co., Ltd.) and $Li_2CO_3$ powder (produced by Honjo Chemical Corporation) that were weighed so as to have an Li/Co molar ratio of 1.01 were mixed and then held at 780° C. for five hours, and resultant powder was pulverized and cracked to a D50 particle size by volume of 0.4 μm in a pot mill so as to obtain powder of LCO plate-like particles. Then, 100 parts by weight of the resultant LCO powder, 100 parts by weight of a dispersion medium (toluene:isopropanol=1:1), 10 parts by weight of a binder (polyvinyl butyral: Product Number BM-2, produced by Sekisui Chemical Co., Ltd.), 4 parts by weight of a plasticizer (DOP: Di (2-ethylhexyl) phthalate, produced by Kurogane Kasei Co., Ltd.), and 2 parts by weight of a dispersant (Product Name: RHEODOL SP-O30, produced by Kao Corporation) were mixed. A resultant mixture was stirred and deaerated under reduced pressure and adjusted to have a viscosity of 4000 cP so as to prepare LCO slurry. The viscosity was measured using an LVT viscometer manufactured by AMETEK Brookfield, Inc. The slurry prepared in this way was molded into sheet form on a PET film by doctor blading so as to form an LCO green sheet. The thickness of the LCO green sheet after drying was 240 μm.

The LCO green sheet peeled off the PET film was cut out into a piece measuring 50 mm per side and placed on the center of a magnesia setter serving as a lower setter (dimensions: 90 mm per side and a height of 1 mm). On the LCO sheet, a porous magnesia setter serving as an upper setter was placed. The aforementioned LCO sheet, sandwiched between the setters, was placed in an alumina sheath measuring 120 mm per side (produced by Nikkato Corporation). At this time, the alumina sheath was not hermetically sealed, and was covered with a lid with a clearance of 0.5 mm left therebetween. A resultant laminate was then degreased for three hours by increasing temperature up to 600° C. at a rate of 200° C./h, and then firing was conducted by increasing the temperature up to 800° C. at a rate of 1000° C./h and keeping the temperature for 10 minutes. After the firing, the temperature was dropped to the room temperature and then a fired body was taken out of the alumina sheath. In this way, an LCO sintered plate with a thickness of approximately 220 μm was obtained. The LCO sintered plate was cut into a circular shape with a diameter of 10 mm by a laser beam machine so as to obtain a positive electrode plate.

(2) Production of Negative Electrode

First, 100 parts by weight of LTO powder (produced by Ishihara Sangyo Kaisha, Ltd.), 100 parts by weight of a dispersion medium (toluene:isopropanol=1:1), 20 parts by weight of a binder (polyvinyl butyral: Product Number BM-2, produced by Sekisui Chemical Co., Ltd.), 4 parts by weight of a plasticizer (DOP: Di (2-ethylhexyl) phthalate, produced by Kurogane Kasei Co., Ltd.), and 2 parts by weight of a dispersant (Product Name: RHEODOL SP-O30, produced by Kao Corporation) were mixed. A resultant mixture of the negative raw materials was stirred and deaerated under reduced pressure and adjusted to have a viscosity of 4000 cP so as to prepare LTO slurry. The viscosity was measured using an LVT viscometer produced by AMETEK Brookfield, Inc. The slurry prepared in this way was molded into sheet form on a PET film by doctor blading so as to form an LTO green sheet. The thickness of the LTO green sheet after drying was set to a value that allowed the LTO green sheet to have a thickness of 250 μm after firing.

A resultant green sheet was cut out into a piece measuring 25 mm per side by a cutting knife and placed on a zirconia setter that had undergone embossing. The green sheet on the setter was placed in an alumina sheath, held at 500° C. for five hours, then increased in temperature at a rate of temperature rise of 1000° C./h, and fired at 800° C. for 10 minutes. A resultant LTO sintered plate was cut into a circular shape with a diameter of 10.2 mm by a laser beam machine so as to obtain a negative electrode plate.

(3) Production of Coin-Type Secondary Cell

The coin-type secondary cell 1 as schematically illustrated in FIG. 1 was produced as follows.

(3a) Bonding of Negative Electrode Plate and Negative Current Collector with Conductive Carbon Paste Acetylene black and polyimide-amide were weighted so as to have a mass ratio of 3:1 and mixed together with an appropriate amount of NMP (N-methyl-2-pyrrolidone) serving as a solvent to prepare a conductive carbon paste. The conductive carbon paste was applied by screen printing on aluminum foil serving as a negative current collector. The negative electrode plate produced in (2) described above was placed so as to fit within an undried print pattern (i.e., a region coated with the conductive carbon paste), and was dried under vacuum at 60° C. for 30 minutes so as to produce a negative electrode structure in which the negative electrode plate and the negative current collector were bonded together via a carbon layer. Note that the carbon layer had a thickness of 10 μm.

(3b) Preparation of Positive Current Collector with Carbon Layer

Acetylene black and polyimide-amide were weighed so as to have a mass ratio of 3:1 and mixed together with an appropriate amount of NMP (N-methyl-2-pyrrolidone) serving as a solvent so as to prepare a conductive carbon paste. The conductive carbon paste was applied by screen printing on aluminum foil serving as a positive current collector, and then dried under vacuum at 60° C. for 30 minutes so as to produce a positive current collector having a surface with a carbon layer. Note that the carbon layer had a thickness of 5 μm.

(3c) Assembly of Coin-Type Secondary Cell

The positive current collector, the carbon layer, the LCO positive electrode plate, the cellulose separator, the LTO negative electrode plate, the carbon layer, and the negative current collector were housed so as to be laminated one above another in this order from the positive electrode can to the negative electrode can between the positive and negative electrode cans configuring the cell case, then filled with the electrolytic solution, and sealed by swaging the positive and negative electrode cans via a gasket. In this way, a coin cell-type lithium secondary cell (coin-type secondary cell 1) with a diameter of 12 mm and a thickness of 1.0 mm was produced. At this time, the electrolytic solution used was a solution obtained by dissolving $LiBF_4$ with a concentration of 1.5 mol/l in an organic solvent obtained by mixing ethylene carbonate (EC) and γ-butyrolactone (GBL) with a volume ratio of 1:3. Since the coin-type secondary cell according to Example 1 had adopted an assembled electrode unit, "Assembled" is described in the field of "Type of Electrode Unit" in Table 1.

(4) Evaluation (4a) Measurement of Percentage of Lithium Carbonate in Electrodes Material pieces for measurement with a total of 0.5 g were extracted from the positive and negative electrode plates fabricated in Example 1 with the same mass ratio as the mass ratio of the positive and negative electrodes in the coin-type secondary cell, and then pulverized and mixed. Resultant particles were suspended in 50 mL of water and stirred for 10 minutes, and then a suspension was left at rest for one hour. Thereafter, a supernatant liquid was extracted and subjected to ICP analysis to measure the mass of lithium carbonate contained in the supernatant liquid. A value obtained by dividing the mass of lithium carbonate by a total mass, i.e., 0.5 g, of the material pieces of the positive and negative electrode plates is described as "Percentage of Lithium Carbonate in Electrodes" in Table 1.

(4b) Measurement of Ratio of Capacities Before and After Reflow Test

The capacity of the coin-type secondary cell was measured by the following procedure. Specifically, after charged at a constant voltage of 2.7V, the cell was discharged at a discharge rate of 0.2C to measure an initial capacity, and the obtained initial capacity was adopted as an initial cell capacity. The same measurement was also conducted after a reflow test to measure the capacity of the cell after the reflow test. The cell capacity after the reflow test was divided by the initial cell capacity to calculate "Ratio of Capacities Before and After Reflow Test" shown in Table 1. Here, in the reflow test, the cell was heated at 260° C. for 30 seconds, using a reflow device (UNI-5016F produced by ANTOM Co., Ltd.).

Example 2

(5) Production of MgO Green Sheet (Separator Green Sheet)

Magnesium carbonate powder (produced by Konoshima Chemical Co., Ltd.) was subjected to heat treatment conducted at 900° C. for five hours so as to obtain MgO powder. The resultant MgO powder was mixed with glass frit (CK0199 produced by Nippon Frit Co., Ltd.) with a weight ratio of 4:1. Then, 100 parts by weight of resultant mixed powder (with a D50 particle size by volume of 0.4 μm), 100 parts by weight of a dispersion medium (toluene:isopropanol=1:1), 20 parts by weight of a binder (polyvinyl butyral: product number BM-2, produced by Sekisui Chemical Co., Ltd.), 4 parts by weight of a plasticizer (DOP: Di(2-ethylhexyl)phthalate, produced by Kurogane Kasei Co., Ltd.), and 2 parts by weight of a dispersant (product name: RHEODOL SP-O30, produced by Kao Corporation) were mixed. A resultant mixture of raw materials was stirred and degreased under reduced pressure and adjusted to have a viscosity of 4000 cP so as to prepare slurry. The viscosity was measured using an LVT-type viscometer produced by AMETEK Brookfield, Inc. The slurry prepared in this way was molded into sheet form on a PET film by doctor blading so as to form a separator green sheet. The separator green sheet was set to have a thickness of 25 μm after firing.

(6) Lamination, Pressure Bonding, and Firing

The LCO green sheet (positive-electrode green sheet) according to Example 1, the MgO green sheet (separator green sheet), and the LTO green sheet (negative-electrode green sheet) according to Example 1 were laminated in order, and a resultant laminate was pressed at 200 kgf/cm² by cold isostatical press (CIP) so as to bond the green sheets together. A laminate obtained by this bonding was stamped into a circular plate-like shape with a diameter of 10 mm, using a stamping die. A resultant circular plate-like laminate was degreased at 600° C. for five hours, subjected to firing in which the temperature was increased up to 800° C. at 1000° C./h and kept for 10 minutes, and then cooled. In this way, a single integral sintered plate that includes three layers, namely, a positive electrode layer (LCO sintered layer), the ceramic separator (MgO separator), and a negative electrode layer (LTO sintered layer).

The production of the coin-type secondary cell was the same as in Example 1. Specifically, the positive current collector, the carbon layer, the integral sintered plate, the carbon layer, and the negative current collector were housed so as to be laminated in this order from the positive electrode can to the negative electrode can between the positive and negative electrode cans, filled with the electrolytic solution, and then sealed by swaging the positive and negative electrode cans. Since the coin-type secondary cell according to Example 2 adopted an integral-type electrode unit, "Integral" is described in the field of "Type of Electrode Unit" in Table 1. The coin-type secondary cell according to Example 2 was evaluated in the same manner as the coin-type secondary cell according to Example 1. At this time, in the measurement of the percentage of lithium carbonate in the electrodes in (4a) described above, the integral sintered plate was pulverized to measure the mass of lithium carbonate from a suspension of resultant particles, and the mass of lithium carbonate was divided by the mass of the positive and negative electrode layers in the integral sintered plate so as to obtain the percentage of lithium carbonate in the electrodes.

Examples 3 to 5

In Example 3, the Li/Co molar ratio was set to 1.06 in the production of the positive electrode in accordance with (1) described above in Example 2. In Example 4, the firing of the integral-type electrode unit (circular plate-like laminate) in (6) described above in Example 2 was conducted at 800° C. for three hours, and water cleaning was conducted by immersing the integral-type electrode unit after firing in 25-degree water and taking the electrode unit out after one hour. In Example 5, the firing of the integral-type electrode unit in (6) described above in Example 2 was conducted at 900° C. for three hours, and hot water cleaning was conducted by immersing the integral-type electrode unit after firing in 60-degree hot water and then taking the electrode unit out after 12 hours. The other procedure in Examples 3 to 5 was the same as the procedure in Example 2. The coin-type secondary cells according to Examples 3 to 5 were evaluated in the same manner as the coin-type secondary cell according to Example 1.

Comparative Example 1

In Comparative Example 1, the Li/Co molar ratio was set to 1.15 in the production of the positive electrode in accordance with (1) described above in Example 2. The other procedure in Comparative Example 1 was the same as the procedure in Example 2. The coin-type secondary cell according to Comparative Example 1 was evaluated in the same manner as the coin-type secondary cell according to Example 1.

In Examples 1 to 5 in which the percentages of lithium carbonate in the electrodes were lower than or equal to 2.5% by mass, the ratio of the capacities before and after the reflow test was higher than or equal to 60%. In contrast, in Comparative Example 1 in which the percentage of lithium carbonate in the electrodes was 5.0% by mass, the ratio of the capacities before and after the reflow test was 20%. Accordingly, it can be thought that, if the percentage of lithium carbonate in the electrodes is 3.0% by mass or less, it is possible to suppress the deterioration of performance caused by reflow soldering. In order to more reliably suppress the deterioration of performance caused by reflow soldering, it can be said that the percentage of lithium carbonate in the electrodes is preferably 2.5% by mass or less.

In Example 5 in which the percentage of lithium carbonate in the electrodes was 0.001% by mass, the ratio of the capacities before and after the reflow test was 60%, which was lower than that in Example 4 in which the percentage of lithium carbonate in the electrodes was 0.003% by mass. Accordingly, in order to suppress the deterioration of performance caused by reflow soldering, arising from an excessively low percentage of lithium carbonate in the electrodes, it can be said that the percentage of lithium carbonate in the electrodes is preferably higher than or equal to 0.002% by mass, and more preferably higher than or equal to 0.003% by mass.

The coin-type secondary cell 1 described above may be modified in various ways.

The above-described coin-type lithium secondary cell 1 for soldering by reflow method is especially suitable for use in an IoT device, but it may of course be used in other applications.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1 Coin-type lithium secondary cell
2 Positive electrode
3 Negative electrode
4 Electrolyte layer
5 Cell case
41 Separator
42 Electrolytic solution

The invention claimed is:

1. A coin-type lithium secondary cell for soldering by reflow method, comprising:
   a positive electrode containing a lithium composite oxide;
   a negative electrode;
   an electrolyte layer provided between said positive electrode and said negative electrode and containing an electrolytic solution; and
   a cell case having an enclosed space in which said positive electrode, said negative electrode, and said electrolyte layer are housed,
   wherein said positive electrode and said negative electrode as a whole contain 0.002% or more by mass and 3.0% or less by mass of lithium carbonate, and
   wherein said positive electrode and said negative electrode are sintered bodies, which contain neither binders nor conductive assistants.

2. The coin-type lithium secondary cell according to claim 1, wherein
   said negative electrode contains a lithium composite oxide.

3. The coin-type lithium secondary cell according to claim 1, wherein
   said electrolyte layer includes a ceramic separator, and
   said positive electrode, said ceramic separator, and said negative electrode are formed into an integral sintered body.

4. The coin-type lithium secondary cell according to claim 1, wherein
said coin-type lithium secondary cell has a thickness of 0.7 to 1.6 mm and a diameter of 10 to 20 mm.

5. The coin-type lithium secondary cell according to claim 1, wherein
said coin-type lithium secondary cell has an energy density of 35 to 200 mWh/cm$^3$ before reflow soldering.

6. The coin-type lithium secondary cell according to claim 1, wherein
said coin-type lithium secondary cell after reflow soldering has a capacity higher than or equal to 65% of the capacity of said coin-type lithium secondary cell before the reflow soldering.

* * * * *